United States Patent [19]
Van Bennekom et al.

[11] 3,901,436
[45] Aug. 26, 1975

[54] TIME METER ASSEMBLY

[75] Inventors: Carl F. Van Bennekom; William J. Schultz, both of Lynnfield; Ralph M. Manning, Winchester, all of Mass.

[73] Assignee: General Electric Company, Schenectady, N.Y.

[22] Filed: Jan. 25, 1974

[21] Appl. No.: 436,435

[52] U.S. Cl............. 235/104; 235/94 R; 235/103; 235/144 ET; 58/125 C
[51] Int. Cl.²..................... G06M 1/10; G06C 15/42
[58] Field of Search.... 235/104, 103, 94 R, 144 ET, 235/144 MA, 117 R, 91 R; 58/125 C

[56] References Cited
UNITED STATES PATENTS

| | | |
|---|---|---|
| 2,650,026 | 8/1953 | Amsbary, Jr. et al. ............. 235/104 |
| 3,123,293 | 3/1964 | Kernander et al. ................ 235/103 |
| 3,334,811 | 8/1967 | Sigl ............................... 235/103 |
| 3,816,714 | 6/1974 | Reed .............................. 235/94 R |

*Primary Examiner*—Stephen J. Tomsky
*Attorney, Agent, or Firm*—Vale P. Myles

[57] ABSTRACT

A low cost time meter assembly adapted for mass production. An arrangement wherein the counter, motor and reduction gear shafts are all mounted parallel on a unitary molded plastic frame, permits use of simple spur gearing. A motor support plate is automatically locked in a properly aligned position during assembly.

10 Claims, 6 Drawing Figures

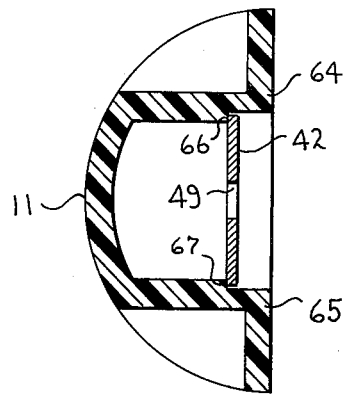
FIG. 4
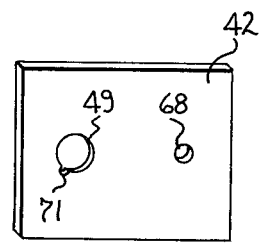
FIG. 5
FIG. 6
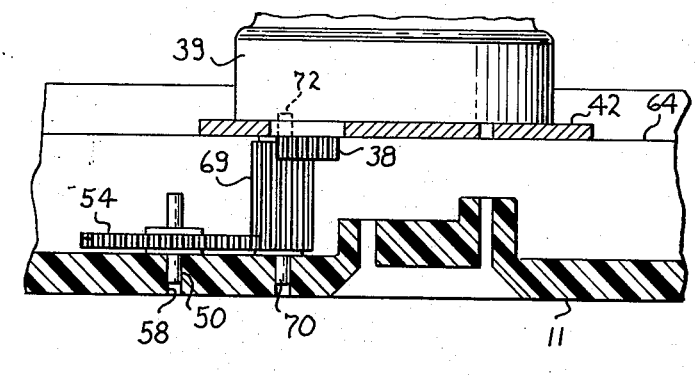

TIME METER ASSEMBLY

BACKGROUND OF THE INVENTION

This invention relates to a time meter used to measure elapsed intervals of time.

Time meters are often used to measure the total time electrical equipment is used. They comprise a counter mechanism similar to an odometer which is driven by a constant speed timing motor through reduction gearing. The gearing ratio is selected so that one revolution of a counter wheel represents one unit of elapsed time such as a minute or an hour. The counter usually has a series of successively actuated wheels that totalize the elapsed time in terms of ones, tens, hundreds, thousands, etc., of time units. In one application, the timing motor of the time meter is energized whenever an electrical apparatus is turned on so that the meter reads out the total time the equipment has been in use. Such a time meter is shown, for example, in U.S. Pat. No. 3,123,293.

Time meters are widely used and are manufactured in large quantities by mass production methods. Heretofore time meters have comprised a multiplicity of counter, gear and motor parts which have been assembled on a frame as several subassemblies. For the gearing to mesh properly, a high degree of manufacturing precision has been required as well as a considerable amount of assembly labor. Also because of the precision required, the frames have been made of metal which is costly.

Accordingly, it is an object of this invention to provide an improved timer meter which has fewer parts, requires less assembly time and can be mass produced at a lower cost than has heretofore been possible.

Another object of the invention is to provide a time meter construction in which all parts are assembled on a one-piece molded plastic frame.

A still further object of the invention is to provide a time meter construction in which the timing motor is automatically aligned with the reduction gearing during assembly.

Further objects and advantages will become apparent as the following description proceeds.

SUMMARY

Briefly, in accordance with the invention, the time meter has a one-piece molded plastic frame on which the counter wheels, gearing and timing motor are assembled. The parts are oriented on the frame so that the counter wheel shaft, the gearing shafts and the motor drive shafts are all parallel. This permits the use of spur gearing which is simple and less expensive than worm gears and bevel gears previously used. To reduce assembly alignment problems, gear wheels rotate on stationary shafts which are attached to the frame by insertion into pre-formed holes. To still further reduce alignment problems the timing motor is supported on a plate which is automatically locked during assembly in a position in which the motor drive pinion properly meshes with the reduction gearing.

For a better understanding of the invention, reference should be made to the following detailed description taken in connection with the accompanying drawings.

BRIEF DESCRIPTION OF THE DRAWINGS

FIG. 4 is a sectional view taken along the section line 4—4 of FIG. 3 showing the configuration of the frame on which the motor support plate is mounted.

FIG. 5 is a perspective view of the motor support plate.

FIG. 6 is a partial sectional view similar to FIG. 3 illustrating how the gearing can be changed to obtain a different gear ratio so that the time meter will register minutes rather than hours.

DETAILED DESCRIPTION

Figure 1:
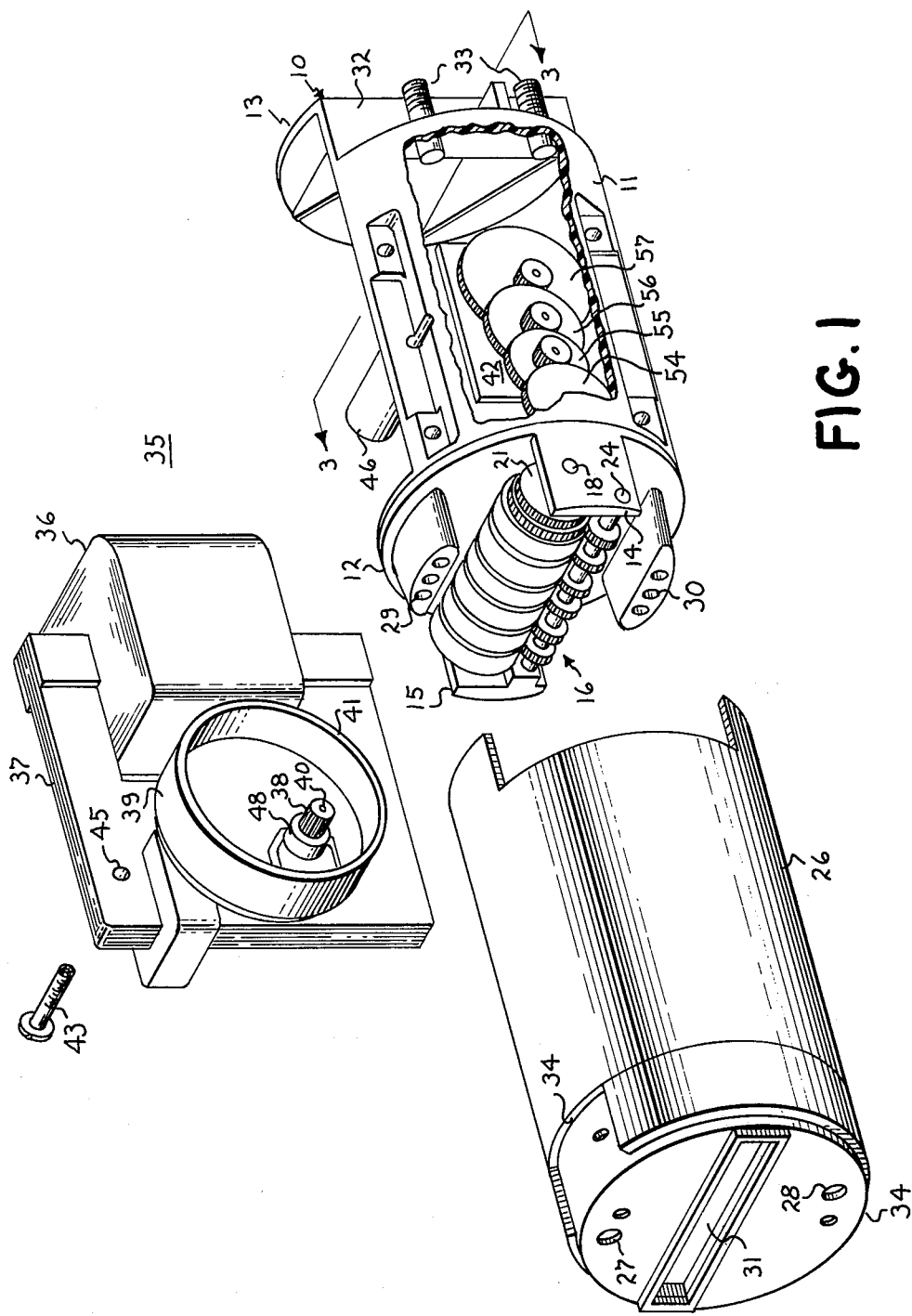
FIG. 1 is an exploded cutaway perspective view of a time meter embodying the present invention.

Referring to FIG. 1, the time meter comprises a molded plastic frame 10 that provides all of the support and locate functions of a completely operational time meter. The frame has a curved center section 11, a circular upstanding front section 12 and a semicircular upstanding back section 13.

Figure 2:
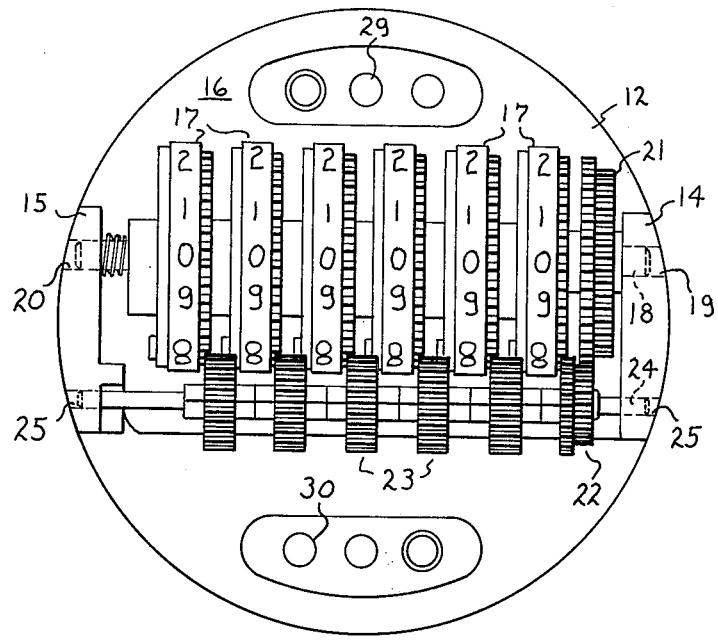
FIG. 2 is a front view showing the counter wheel assembly.

Extending in front of the frame section 12 are two integrally formed supports 14 and 15 which carry a counter assembly indicated generally by numeral 16. As best shown in FIG. 2, the counter, of known construction, may, as shown, comprise a plurality of indicating wheels 17 rotatably mounted on a fixed shaft 18, the ends of which are pressed into holes 19 and 20 in the supports 14 and 15. The indicating wheels carrying number indicia are rotatably driven by a spur gear 21, also mounted on shaft 18, through a pinion 22. Considering the indicating wheels from right to left it will be understood that after the first wheel makes a complete revolution the second wheel is rotated a tenth of a revolution and after the second wheel makes a complete revolution the third wheel is rotated a tenth of a revolution, etc. This sequential driving action is performed by a series of pinions 23 which engage special teeth in the indicating wheels. The pinions 22 and 23 are rotatably mounted on a second stationary shaft 24, the ends of which are pressed into holes 25 in the supports 14 and 15.

The meter has a cylindrical cover 26 (shown removed in FIG. 1) adapted to be slid over the frame to a position in which it is supported on the front and back frame sections 12 and 13. Screws inserted through cover holes 27 and 28 and driven into frame mounting holes 29 and 30 hold the cover in the assembled position. In this position, the indicating wheels 17 of the counter 16 are viewable through a window 31. The back portion of the frame 13, together with a lower recessed portion 32 provide a closure of the installed cover and additionally provide a support for motor terminals 33. If desired, an instrument face of the type disclosed in U.S. Pat. No. 3,717,118 may be attached to the front of the cover and for this purpose recesses 34 are provided in the front of the cover.

The gear 21 of counter 16 is driven through reduction gearing by a constant speed timing motor 35. The motor illustrated is a known A.C. shaded-pole synchronous type having an energizing coil 36, a magnetic core 37 and a rotor (not shown) which drives an output pinion 38 through a gear reduction (not shown) encased in a cylindrical housing 39. The motor pinion 38 is mounted on a shaft 40 which extends in a direction parallel to the axis of housing 39. Extending from the housing is a circular lip 41, the outer edge of which is adapted to engage and support the motor on a support plate 42 so that the axis of shaft 40 is perpendicular to the plate. In the assembled position illustrated in FIGS. 3 and 6 the motor is fastened to the support plate by two screws 43 and 44 which pass through holes 45 in the core 37 and are driven into holes in bosses 46 and 47 extending outwardly from the center frame section 11. In order to properly orient the motor in the support plate, there is provided a circular boss or rabbet 48 concentric with shaft 40 which, in the assembled position, enters a locating hole 49 in the support plate. The motor drive pinion 38 drives the counter gear 21 through speed reduction gearing which will now be described.

Figure 3:
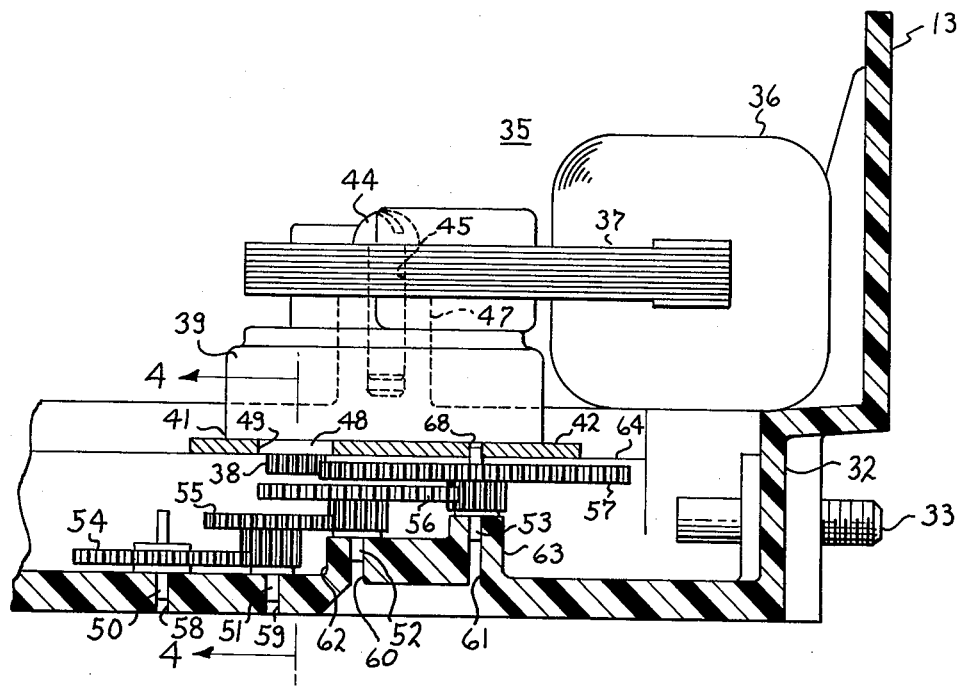
FIG. 3 is a partial sectional view taken along the section line 3—3 of FIG. 1 showing details of the motor mount and reduction gearing.

Referring now to FIG. 3, the speed reduction gearing comprises four gear shafts 50, 51, 52 and 53 on which are rotatably mounted four gear wheels 54, 55, 56 and 57. The gear wheels 55, 56 and 57 are double gears having a large upper gear attached to and rotating with a smaller lower pinion. The pinion of each of these gear wheels meshes with the larger gear of the adjacent wheel so that speed change is obtained. The gear wheel 54 is an idler meshing with the counter drive gear 21 while the gear wheel 57 at the other end of the gear train meshes with the drive pinion 38 of motor 35.

The gear shafts 50, 51, 52 and 53 are stationary being supported and oriented on the frame section 11 by pressing their ends into pre-formed holes 58, 59, 60 and 61. In one preferred embodiment, these holes are molded in the frame at the predetermined locations for proper gear alignment and mesh, the holes being slightly smaller than the shaft ends to secure an interference fit. Preferably the shaft ends are inserted into the holes while being ultrasonically vibrated. This causes momentary softening of the plastic around the holes and eliminates stresses that might otherwise cause the plastic to crack or chip. The gear wheels 54, 55, 56 and 57 are loosely mounted on the gear shafts so that the bearing surfaces are between the wheels and their associated gear shafts rather than between the gear shafts and the frame section 11. This gear mounting system makes feasible the use of a molded plastic rather than a cast metallic frame with a consequent cost reduction. Another advantage is that the gear shafts need to be supported from only one end. This eliminates the need to have the other end of each shaft supported by a separate member attached to the frame which would require close manufacturing tolerances and give rise to an alignment problem during assembly. In order to keep the gear wheels 56 and 57 in position on their gear shafts for proper meshing with adjacent gears, bosses 62 and 63 are provided to support and maintain the gear wheels in meshing positions.

To provide proper meshing of the reduction gears with each other and with the counter drive gear 21, the gear shafts 50, 51, 52 and 53 are all oriented on the frame so that they are parallel to the counter shaft 18. For the reduction gear 57 to mesh properly with the motor drive pinion 38, it is also necessary that the motor shaft 40 be parallel to the gear shaft 53 and to be spaced therefrom by a predetermined distance. To insure that this relationship will be obtained during assembly of the motor, an automatic alignment arrangement is provided which will now be described.

As best shown in FIG. 4, the center frame section 11 has a pair of inwardly projecting shoulders 64 and 65 having notches 66 and 67 designed to engage and support plate 42 in the position shown. When supported in this position the plane of the plate is perpendicular to the axes of all of the gear shafts mounted on the frame. Thus, when the motor housing 39 is pushed against this plate during mounting, a space relationship is established in which the motor shaft 40 is also parallel to gear shaft 53.

To establish the second required relationship, that the motor shaft 40 be spaced a predetermined distance from gear shaft 53 for proper gear meshing, an automatic positioning and locking feature is provided as will now be explained.

During assembly of the time meter, the counter wheels and the reduction gears are first assembled on the frame. The motor support plate 42 is then placed on shoulders 64 and 65 so that its planar position is determined by engagement with the notches 66 and 67. The plate being rectangular has parallel sides engaging the notches which permit the plate to be slid back and forth in a direction to vary the distance between the motor shaft 40 and the gear shaft 53 when the motor is installed on the plate. When the plate is slid to the proper position, the upper end of gear shaft 53 enters a locater hole 68 in the plate and locks it in this position. Thereafter the motor is installed on the plate so that rabbet 48 enters the other location hole 49. This brings the motor pinion 36 into engagement with gear wheel 57. Thereafter the motor is fastened down against the motor support plate by inserting and tightening screws 43 and 44. This whole assembly operation can be performed very quickly in the factory by relatively unskilled labor with a consequent reduction in cost. Because the one piece frame locates and supports all movable parts, alignment problems are virtually eliminated.

Another advantage of the time meter construction described above is that the speed ratio of the reduction gearing can be easily changed for different models. For example, the gearing shown in FIG. 3 is used in models where the counter 16 reads hours and tenths of hours. Where it is desired to have the counter read minutes and tenths of minutes, the gear ratio must be changed by a factor of 60 to 1. In FIG. 6 this is shown as being accomplished by simply omitting gear wheels 55, 56 and 57 along with their associated gear shafts and substituting a long pinion 69 to couple the idler gear 54 with the motor drive pinion 38. In this case, the pinion 69 is carried by a longer gear shaft 70. Another locater hole 71 in motor plate 42 receives the outer end 72 of shaft 70 so as to properly position the motor during assembly. The same support plate can be used for both models.

It will be apparent from the foregoing that there has been provided a time meter construction that has a relatively few parts, that is flexible as to model change and that can be easily assembled by unskilled labor due to the automatic alignment features.

While there have been shown what are considered to be preferred embodiments of the invention, it will be apparent to those skilled in the art that various changes and modifications may be made therein without departing from the spirit and scope of the invention.

What is claimed as new and desired to be secured by Letters Patent of the United States is:

1. A time meter assembly comprising:
   a. a frame member;
   b. a counter comprising rotating indicating wheels mounted on said frame;
   c. a timing motor having a rotating shaft carrying a driving pinion for driving the wheels of the counter;
   d. gear reduction means forming a driving connection between said counter and said motor pinion, said gear reduction means comprising a gear shaft on which a reduction gear is rotatably mounted; and
   e. means mounting said motor on said frame with automatic alignment during assembly, said motor mounting means comprising a support plate on which said motor is mounted, shoulder means extending from said frame on which said plate is supported and guided for sliding movement in a direction to adjust the distance between said motor pinion and said reduction gear, said support plate having a locater hole therein adapted to receive an end of said reduction gear shaft in locking engagement when slidably moved to a position in which said motor pinion and reduction gear are in proper meshing engagement.

2. The time meter assembly of claim 1 wherein the support plate has parallel sides and moves in a groove defined by opposed shoulders extending from the frame.

3. The time meter assembly of claim 1 wherein the reduction gear shaft is stationary and supported on the frame by having one end thereof inserted into a hole in the frame the sides of which frictionally restrain and position the shaft.

4. The time meter assembly of claim 1 wherein the timing motor has cylindrical boss coaxial with the pinion shaft and the support plate has a circular hole therein adapted to receive the boss to position the motor with respect to the plate.

5. The time meter assembly of claim 4 wherein the motor has a bearing surface engaging the support plate so that the axis of the pinion shaft is maintained parallel to the axis of the reduction gear shaft.

6. The time meter assembly of claim 1 wherein the indicating wheels of the counter are mounted on a shaft supported on the frame so that the axis of the counter shaft is parallel to the axes of the motor pinion and reduction gear shafts and the gear reduction means comprises a plurality of intermeshing spur gears.

7. In a time meter assembly the combination comprising,
   a. a unitary frame member;
   b. a counter including a plurality of indicating wheels rotatably mounted on a shaft;
   c. a drive motor having an output shaft;
   d. means mounting said counter and motor on said frame so that said counter and motor shafts are parallel; and
   e. spur driving means interconnecting said counter and drive motor so that the counter provides an indication of the number of revolutions of the drive motor shaft, said driving means comprising a spur gear rotating on a gear shaft, said gear shaft being mounted on said frame and extending therefrom in a direction parallel to said counter and drive motor shafts, all of said shafts being maintained in parallel spaced relation for proper intermeshing of the spur gear driving means with the counter and drive motor by said unitary frame member.

8. The time meter assembly of claim 7 wherein the gear shaft is stationary and supported on the frame by having an end thereof inserted into a hole in the frame the sides of which frictionally restrain and position the shaft.

9. The time meter assembly of claim 7 wherein the spur gear driving means comprises a plurality of intermeshing spur gears rotatably mounted on a plurality of parallel gear shafts.

10. The time meter assembly of claim 9 wherein the gear shafts are stationary and supported on the frame by having an end of each shaft inserted into a hole in the frame the sides of which frictionally restrain and position the shaft, the frame being made of a molded plastic material and the shaft holes being spaced to obtain proper alignment of the gears.

* * * * *

UNITED STATES PATENT OFFICE
CERTIFICATE OF CORRECTION

PATENT NO. : 3,901,436
DATED : August 26, 1975
INVENTOR(S) : Carl F. Van Beenekom and William J. Schultz, et al.

It is certified that error appears in the above-identified patent and that said Letters Patent are hereby corrected as shown below:

In the Claims

Claim 7, line 16 (letter "e") - Col. 6 -

After "spur" insert -- gear --

Signed and Sealed this thirtieth Day of March 1976

[SEAL]

Attest:

RUTH C. MASON
Attesting Officer

C. MARSHALL DANN
Commissioner of Patents and Trademarks